US 6,581,940 B2

(12) United States Patent
Dittel

(10) Patent No.: US 6,581,940 B2
(45) Date of Patent: Jun. 24, 2003

(54) CONCRETE MANHOLE CONNECTOR GASKET

(75) Inventor: Claudio Dittel, Fort Worth, TX (US)

(73) Assignee: S&B Technical Products, Inc., Ft. Worth, TX (US)

( * ) Notice: Subject to any disclaimer, the term of this patent is extended or adjusted under 35 U.S.C. 154(b) by 0 days.

(21) Appl. No.: 09/919,188

(22) Filed: Jul. 30, 2001

(65) Prior Publication Data

US 2003/0019163 A1 Jan. 30, 2003

(51) Int. Cl.[7] ................................................. F16L 5/02
(52) U.S. Cl. ....................... 277/606; 277/616; 277/626; 285/110; 285/230; 52/20
(58) Field of Search ................................ 277/602, 603, 277/606, 608, 609, 616, 617, 618, 619, 626; 285/110, 213, 215, 216, 111, 112, 230, 345; 52/20, 21

(56) References Cited

U.S. PATENT DOCUMENTS

| | | | | |
|---|---|---|---|---|
| 3,081,102 A | * | 3/1963 | Murray et al. .............. 277/607 |
| 3,315,971 A | * | 4/1967 | Sakurada .................... 277/615 |
| 3,787,061 A | * | 1/1974 | Yoakum ..................... 277/605 |
| 3,958,313 A | | 5/1976 | Rossborough ........... 29/890.14 |
| 4,061,459 A | * | 12/1977 | Parmann ..................... 425/393 |
| 4,159,829 A | | 7/1979 | Ditcher ....................... 277/605 |
| 4,203,190 A | | 5/1980 | Temple et al. ................ 29/451 |
| 4,333,662 A | | 6/1982 | Jones ......................... 277/606 |
| 4,350,351 A | * | 9/1982 | Martin ........................ 277/605 |
| 4,387,900 A | | 6/1983 | Ditcher et al. ................ 29/235 |
| 4,463,955 A | * | 8/1984 | Delhaes ...................... 277/314 |
| 4,598,915 A | * | 7/1986 | Gilbert ....................... 277/606 |
| 4,641,858 A | * | 2/1987 | Roux ......................... 277/615 |
| 4,693,482 A | | 9/1987 | Daigle et al. ............... 277/606 |
| 4,711,455 A | | 12/1987 | Ditcher et al. .............. 277/616 |
| 4,856,561 A | * | 8/1989 | Zicaro ........................ 138/109 |
| 5,114,162 A | * | 5/1992 | Ditcher ....................... 277/605 |
| 5,248,154 A | * | 9/1993 | Westhoff et al. ............ 277/606 |
| 5,529,312 A | | 6/1996 | Skinner et al. .............. 277/604 |
| 5,649,712 A | | 7/1997 | Ekholm ...................... 277/607 |
| 5,876,039 A | | 3/1999 | Skinner et al. .............. 277/617 |
| 6,328,309 B1 | * | 12/2001 | Corbett, Jr. ................. 264/275 |
| 6,406,025 B1 | * | 6/2002 | Westhoff et al. ............ 277/314 |

FOREIGN PATENT DOCUMENTS

FR  2580763 A1 * 10/1986

* cited by examiner

Primary Examiner—Ramon O. Ramirez
Assistant Examiner—Jon Szumny
(74) Attorney, Agent, or Firm—Charles D. Gunter, Jr.

(57) ABSTRACT

An integrated connection for a manhole having a wall opening defining a peripheral surface and a ring shaped elastomeric body cast in place on the peripheral surface. The elastomeric body includes a foot region cast within the wall thickness of the manhole and connected to a leg region. The leg region terminates in a primary sealing surface. A reinforcing element passes through the ring shaped elastomeric body at one circumferential location which, when viewed in cross section, appears below the peripheral surface of the wall opening once the gasket is cast in place.

13 Claims, 3 Drawing Sheets

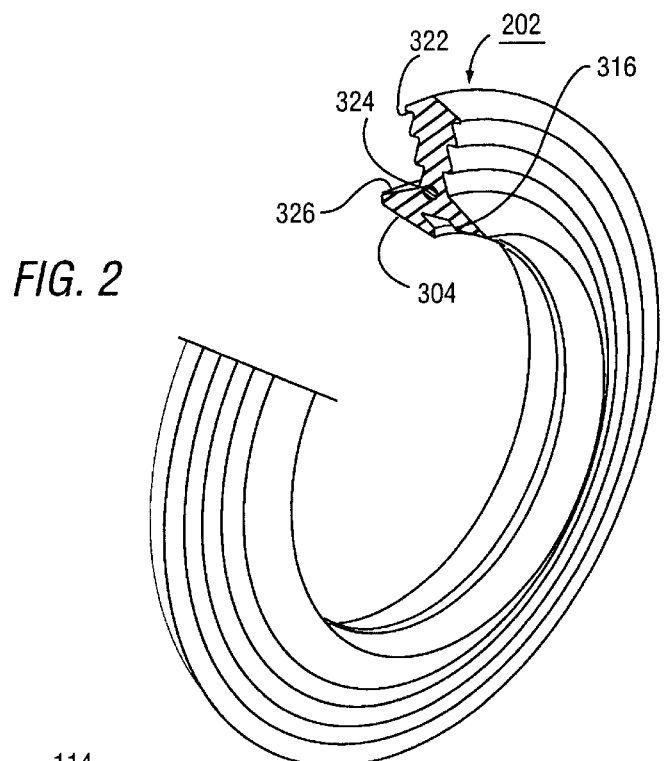
FIG. 2
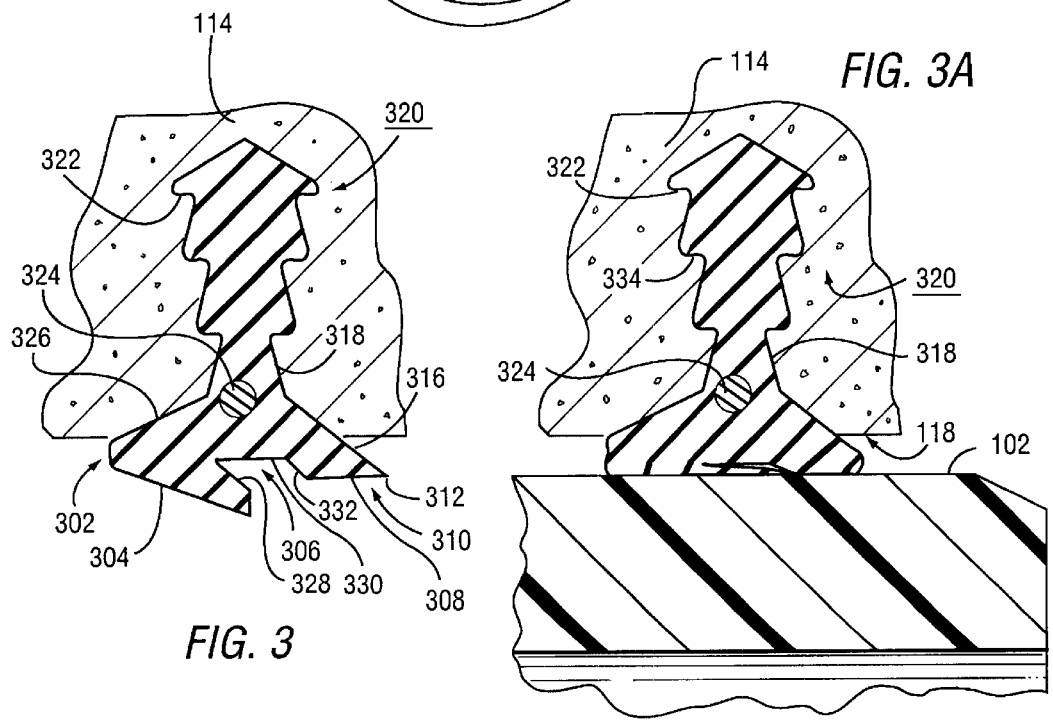
FIG. 3
FIG. 3A

CONCRETE MANHOLE CONNECTOR GASKET

BACKGROUND OF THE INVENTION

1. Technical Field

The present invention relates generally to the installation of sanitary sewers and more specifically, to the problem of tightly sealing a manhole against inflow or outflow of liquid at the point where a sewer pipe passes through its walls and still more specifically to elastomeric gaskets for resiliently supporting and sealing the space between a pipe and the surrounding surface of an opening in the manhole through which the pipe passes.

2. Description of the Related Art

In sewer lines, manholes are ordinarily installed at various intervals including locations where the sewer line changes elevation or direction. Manholes are typically formed in molds from a settable material such as concrete. The mold may form one or more annular openings in the manhole in which sewer pipes are positioned to lie adjacent a wall of the manhole defining that particular opening. The joint between the manhole wall and outer surface of the sewer pipe is sealed to prevent ground water from entering the manhole and to prevent contents of the manhole, such as sewage and water, from leaking out of the manhole. When ground water enters the manhole, it often brings in sediment which collects in the sewer over time. Such sediment causes clogs and inhibits the ability of the manhole to carry water. In addition, infiltration of ground water also increases the total volume of sewage flow through sewer lines which increases the required size of pipe needed as well as the expense of treatment of the total sewage flow. When the contents of the manhole leak, they can pollute the ground water.

Various types of gaskets for sealing joints between pipes and manholes are known. Often these gaskets are formed from an elastomeric material that is either inserted in an opening in the manhole and expanded via a ring or physically embedded in a portion of a wall adjacent the opening in the manhole. These gaskets typically provide at least one extending projection that surrounds and engages an outer wall or surface of a pipe extending through the gasket and the opening.

Expanded gaskets require rings that exert an outwardly, radially directed force on an inner surface of a gasket positioned within the opening to compress the gasket against a manhole wall defining the opening. These rings increase both material and labor installation costs associated with sealing the joint between the manhole wall and pipe. Material costs are increased because these rings are somewhat complicated corrosion-resistant metal structures that must be manually fabricated or are molded plastic structures that are made, at least in part, from high strength, expensive compositions. Labor costs are increased because installation and expansion of such rings to effect a seal requires maintaining proper alignment of the ring and use of equipment such as mechanical expansion units. In addition, seal failure will occur if the rings are improperly installed.

Embedded gaskets resolve the above-described problems associated with expanded gaskets. Embedded gaskets include those that are compressed between the manhole wall and outer wall or surface of the pipe as well as those that include sleeves or boots that are compression or clamped around the outer wall or surface of the pipe. Embedded gaskets solve many of the expense problems associated with the manufacture and installation of expansion gaskets. Embedded gaskets also allow a larger diameter of pipe to be inserted into an opening in a manhole than expanded gaskets because a separate ring is unnecessary. As is known, outside pipe diameter size can increase up to a certain point at which an expanded gasket can no longer be used for a particular sized manhole because the width of a wall defining an opening in the manhole will no longer be large enough to support the expansion ring. This means that a next, larger sized, more expensive manhole must be used for the larger diameter pipe.

A further advantage of embedded gaskets over expanded gaskets is that they can be set in the wall of the manhole defining the opening instead of requiring the gasket to be released before being used. Setting a gasket within the wall helps protect it against damage during shipment and handling. However, one of the problems with embedded gaskets is that they can, on occasion, roll and shift as the pipe is being inserted. It is critical, during the installation process, that the gasket not be able to twist or flip since a displaced or dislocated gasket will adversely affect the ultimate sealing capacity of the joint. Irrespective of the type of sealing action of the sealing element, such as compression sealing action, lip sealing action or a combination thereof, it is necessary that the sealing gasket consists of a relatively soft elastomeric material. However, a sealing ring which is formed entirely of a material which is sufficiently soft and elastomeric to provide the sealing function has the disadvantage that it is difficult to retain in the desired position. There is also the risk that such a sealing ring will be displaced from its sealing position if the difference of the internal or external pressures on either side of the sealing ring are sufficiently great. In addition, the rolling and shifting of the embedded gasket can weaken the actual manhole material itself and in turn adversely affect the ultimate sealing capacity of the joint.

What is needed is an embedded gasket that will not tend to roll and shift as the pipe is being inserted within a manhole opening or be displaced from its sealing position due to a difference of internal or external pressure. In addition, the embedded gasket should not be prone to rolling and shifting and should stand up to general use without weakening the settable material of the manhole itself.

BRIEF SUMMARY OF THE INVENTION

It is an object of the present invention to provide an integrated manhole connection including a sealing gasket that will not tend to roll and shift as a mating pipe is being inserted within an opening in the manhole.

It is another object of the present invention to provide an improved gasket that will not be displaced from its sealing position due to a difference of internal or external pressures on either side of the sealing connection.

It is yet another object of the present invention to provide an improved gasket for a manhole connection which can stand up to general use without weakening the settable material of which the manhole is formed.

It is another object of the present invention to provide an improved gasket for a manhole connection that can be readily installed at the time the manhole is being cast, and whose location can be readily controlled at will.

It is yet another object of this invention is to provide such a manhole connection that can be pre-manufactured and then requires no tools for installation at a job site.

The above objects are achieved by providing an improved manhole connection for a precast manhole having a wall thickness and a wall opening defining a peripheral surface which is perpendicular to an outside surface of the manhole. A ring shaped elastomeric body is cast in place within the wall opening. The elastomeric body has a substantially homogeneous composition which, when viewed in cross section, includes a foot region enclosed within the wall thickness of the wall opening. The foot region is connected to a leg, the leg being terminated at a primary sealing surface. A reinforcing element passes through the ring shaped elastomeric body at one circumferential location which when viewed in cross section appears below the peripheral surface of the wall opening.

Additional objects, features and advantages will be apparent in the written description which follows.

BRIEF DESCRIPTION OF THE DRAWINGS

The novel features believed characteristic of the invention are set forth in the appended claims. The invention itself however, as well as a preferred mode of use, will best be understood by reference to the following detailed description of an illustrative embodiment when read in conjunction with the accompanying drawings, wherein:

FIG. 2 is an isolated view of the sealing gasket used in the integrated manhole connection of the invention;

FIG. 3 is an isolated, cross sectional view of the sealing gasket of the invention shown embedded within the wall thickness of the manhole opening;

FIG. 3A is a view similar to FIG. 3 but showing a mating pipe used to form a sealed manhole connection;

DETAILED DESCRIPTION OF THE PREFERRED EMBODIMENT

Figure 1:
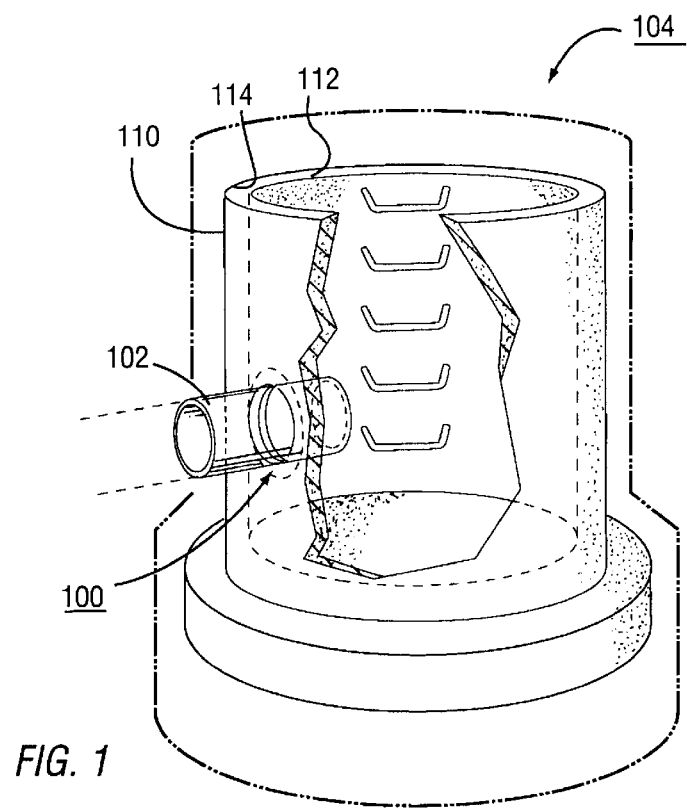
FIG. 1 is a perspective view of a manhole with parts broken away and showing a mating pipe used to form a manhole connection.
Figure 1A:
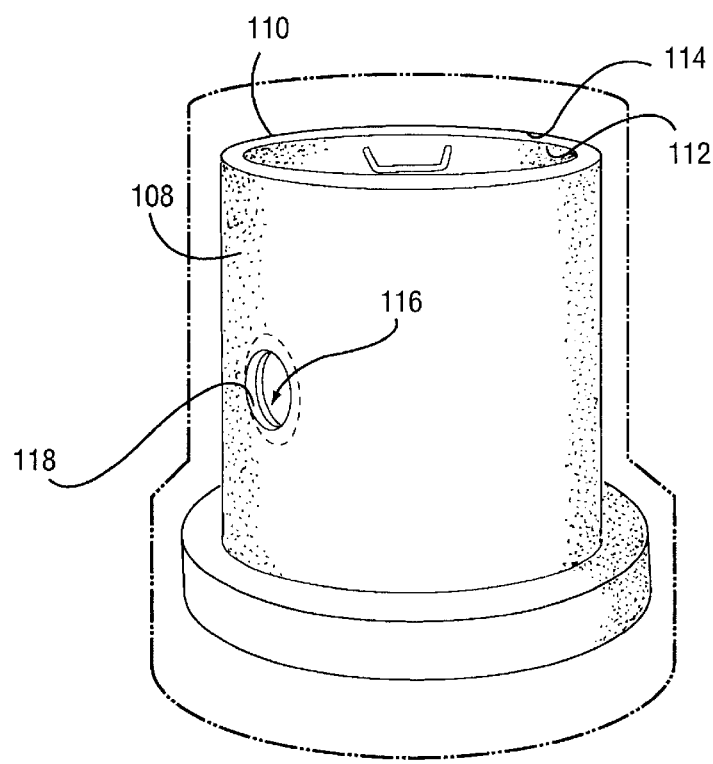
FIG. 1A is a perspective view similar to FIG. 1 but with the mating pipe removed to better illustrate the manhole opening.

Turning to FIGS. 1 and 1A, there is shown a manhole connection, designated generally as 100, provided for connecting a sewer pipe or insertion pipe 102 to a manhole 104. The manhole 104 is formed of a cast, settable material. Preferably, the manhole 104 is made of concrete but may be made of vitrified clay or other similar castable material and is generally cylindrical in shape and typically about 3–5 feet in diameter and about 3 feet high. Generally the manhole 104 is sufficiently large enough to accommodate a person working therein.

The manhole 104 has at least one wall portion 108 were the wall 108 (FIG. 1A) defined by an outside surface 110 and an inside surface 112 separated by a wall thickness 114. The wall thickness 114 can vary but is generally less than about 12 inches. An opening 116 in the manhole wall 108 is provided that communicating the outside surface 110 and inside surface 112 of the manhole 104 for insertion of the mating pipe 102. The opening 116 is bounded by a peripheral surface 118 which is generally perpendicular to the outside surface 110 of the manhole 104. The peripheral surface 118 has a thickness which is typically the same thickness as that of the wall 114 but can be less than the entire wall thickness which, in this case, is about 12 inches.

A ring shaped elastomeric body gasket body 202 (FIGS. 2, 3, and 3A) is provided in order to form a fluid seal between the pipe 102 and the manhole wall 108 in order to prevent water or sewage charged into the manhole 104 from leaking outwardly past the pipe 102 and to prevent ground water from leaking into the inside of the manhole 104. Also, the elastomeric gasket body 202 is provided in order to afford a small degree of freedom of movement between the pipe 102 and the manhole 104 to compensate for misalignment which occurs during installation or to accommodate subsequent shifting of the supporting soil for the manhole 104 and pipe 102. The elastomeric gasket body 202 is cast in place so as to present an exposed sealing face on the peripheral surface 118. Generally, the elastomeric gasket body 202 will thick enough to cover about half of the exposed area of the peripheral surface 118. However, various thicknesses of the elastomeric gasket body 202 are suitable so long as a good relatively secure seal is provided between the pipe 102 and the manhole wall 108. The elastomeric gasket body 202 has a substantially homogeneous composition and maybe made of an elastomeric material such as neoprene, isoprene, or a combination thereof, natural gum rubber, or other rubber-like material resilient in nature. A 55 Durometer natural or synthetic rubber such as a "SBR" commercial grade rubber provides preferred deformability of the elastomeric gasket body 202.

The geometry of the elastomeric gasket body 202 can best be appreciated with respect to the cross sectional view presented in FIG. 3 of the drawings. The elastomeric gasket body 202 has a leading nose region 302 which is joined to a radially inwardly slanting primary sealing surface 304 which forms a lip seal for engaging the pipe 102 during insertion. The primary sealing surface 304 is joined to a secondary sealing surface 310 by an intermediate circumferential groove region 306. The secondary sealing surface 310 comprises a planar circumferential region 308 which terminates in an inside corner 312 of the elastomeric body 202.

The inside corner 312 is connected to a leg region 318 of the gasket by an external gasket surface 316. The external gasket surface 316 begins as a uniformly sloping surface at the inside corner 312. The leg 318 is connected to a foot region 320 of the gasket which is enclosed within the wall thickness 114 of the manhole to provide an anchoring effect and add stability to the elastomeric body 202. The leg 318 is connected to the nose region 302 by an oppositely sloping surface 326. In one embodiment, the leg 318, foot region 320, a portion of the outermost wall region 316, and a portion of the wall region 326 are all embedded within the wall thickness of the manhole so as to provide added stability to the elastomeric gasket body 202.

Figure 5:
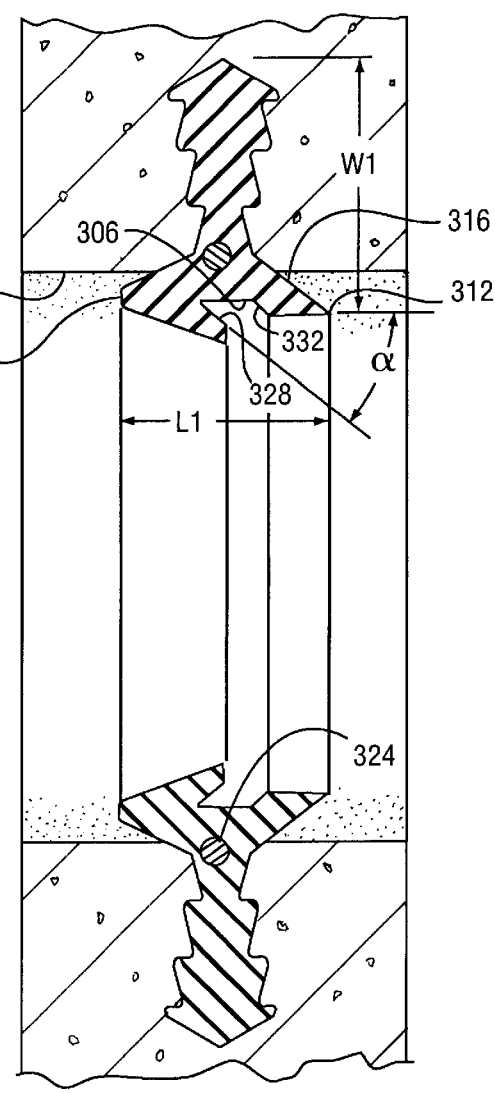
FIG. 5 is an isolated, cross sectional view of the sealing gasket of the invention within a manhole opening showing the sealing surfaces of the gasket.

In the preferred example illustrated in FIG. 5, the groove region 306 of the elastomeric body 202 includes an inner wall 328 which forms an acute angle a of approximately 40° with respect to the groove region 306. The groove region 306 also includes an outer wall 332 which forms an obtuse angle with respect to the groove region 306. The slope of the external gasket surface 316 forms an angle β of approximately 54° with respect to a vertical axis drain through the inside corner 312.

As shown in FIGS. 3 and 3A, the foot region 320 projects away from the remainder of the elastomeric body 202 and is generally perpendicular thereto. The foot region thus helps secure the elastomeric body 202 to the peripheral surface 118 of the opening 116. At least one rib or step 322 is formed on the foot region 320 to help anchor the elastomeric body 202 to the peripheral surface 118. In a preferred embodiment, the foot region 320 has three ribs 322 with each successive rib defining a retaining edge 334 (FIG. 3A). The outermost extent of the foot region forma a triangular cross-sectional region with the apex pointing away from the elastomeric body 202. The foot region 320 could have other shapes, as well, such as a generally trapezoidal shape, or any other shape that is effective in securing the elastomeric body 202 within the wall thickness 114.

As shown in FIG. 5, the elastomeric gasket body 202 has a length defined between the nose region 302 and the inside corner 312 thereof and has an overall width defined between the outermost wall region pitch point and the lip region innermost extent. The overall length is illustrated as "L1" in FIG. 5. The overall width is illustrated as "W1" in FIG. 5. One preferred length to width ratio is roughly about 1:1.

A reinforcing element, such as a metal ring 324, passes through the ring shaped elastomeric body 202 at one circumferential location such that when viewed in cross section appears below the peripheral surface 118 of the wall opening 116 as seen in FIGS. 3A and 5. The metal ring 324 is similar to the one disclosed in U.S. Pat. No. 5,988,695 assigned to assignee and is incorporated herein by reference. By providing a metal ring 324 below the peripheral surface 118, the elastomeric body 202 is made resistant to deformation so that the elastomeric body 202 as a whole is securely maintained on the peripheral surface 118 during the installation of the mating pipe 102. Also, the metal ring 324 helps to retain the elastomeric body 202 in position and insure the elastomeric body 202 is not dislodged or displaced during storage, transportation or field installation once the formation of the manhole 104 is completed. Because the metal ring 324 is embedded within the elastomeric body 202, it is entirely isolated from the external environment including water, sewage or other fluids flowing through the pipe joint. As such, the metal ring 324 is not subject to corrosion or deterioration by contact with liquids. The combination of the relative position of the metal ring 324 and the positioning of the leg 318, foot region 320, wall region 316, and wall region 326 below the peripheral surface 118 combine to improve the overall properties of the elastomeric body 202 and help make the elastomeric body 202 resistant to deformation so that the elastomeric body 202 as a whole is securely maintained on the peripheral surface 118 during the installation and subsequent use of pipe 102.

Figure 4:
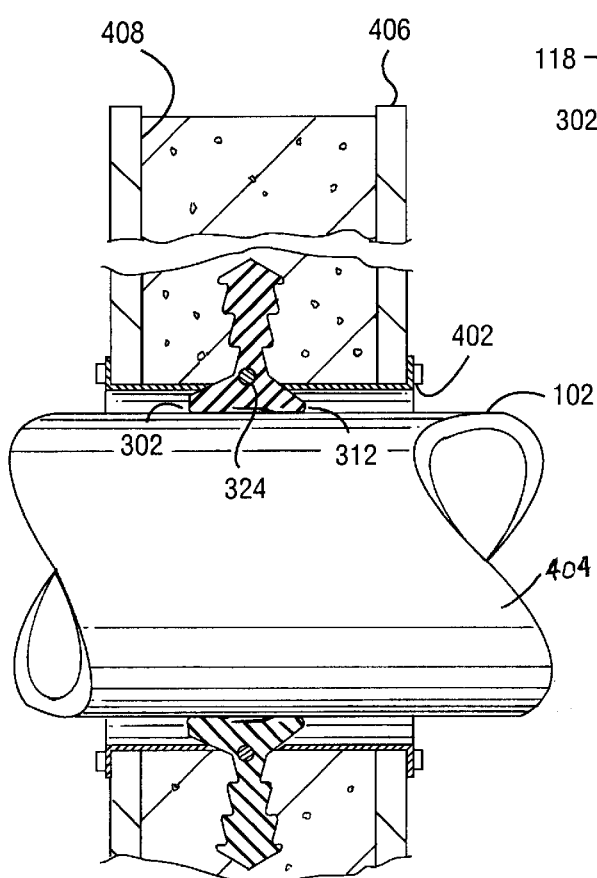
FIG. 4 is a side view, partly broken away and partly in section of a form used to manufacture the integrated connection of the invention.
Figure 4:
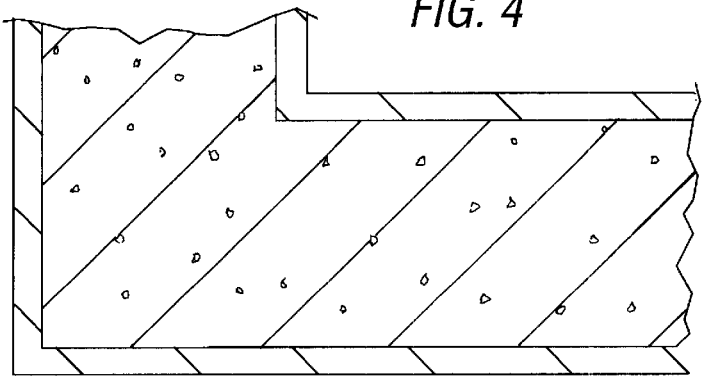

FIG. 4 shows a fixture used to cast the gasket body 202 in place. The pipe 102 is made from a standard available plastic pipe, such as PVC pipe, commonly used in sewer systems. Support members 402 are used to support the gasket body 202 on the outer surface 404 of the pipe section 102 and within the mold fixture 406. Settable material, such as concrete, is then poured into the mold space 408 and is allowed to cure. As shown in FIGS. 1 and 4, the result is an elastomeric body 202 which is cast within the wall opening of the manhole with the leading nose region 302 is facing the outside surface 110 of the manhole. Subsequent to curing, pipe section 102 is removed so the elastomeric body 202 is cast within a formed wall thickness 114 of the manhole 104. If the manhole 104 was manufactured off site, then the manhole 104 can be transported to a desired location and placed into proper position.

An invention has been provided with several advantages. The integrated manhole connection of the invention includes a sealing gasket which can be cast in place in a concrete manhole without the necessity of field installation. The manhole connection of the invention can thus be premanufactured and then requires no tools for installation at a job site. The sealing gasket will not tend to roll and shift as a mating pipe is being inserted within an opening in the manhole. Additionally, the sealing gasket will not be displaced from its sealing position due to a difference of internal or external pressures on either side of the sealing connection. By providing a metal ring below the gasket peripheral surface, the elastomeric body of the gasket is made resistant to deformation so that the elastomeric body as a whole is securely maintained on the peripheral surface of the concrete manhole opening during the installation of the mating pipe. Also, the metal ring helps to retain the elastomeric body in position and insure the elastomeric body is not dislodged or displaced during storage, transportation or field installation once the formation of the manhole is completed. Because the metal ring is embedded within the elastomeric body, it is entirely isolated from the external environment including water, sewage or other fluids flowing through the pipe joint. As a result, the metal ring is not subject to corrosion or deterioration by contact with liquids. The combination of the relative position of the metal ring and the positioning of the leg, foot region and wall regions of the gasket below the peripheral surface of the manhole opening combine to improve the overall properties of the elastomeric body. This combination of structural features insures that the elastomeric body is resistant to deformation so that the elastomeric body as a whole is securely maintained on the peripheral surface of the manhole opening during the installation and subsequent use.

While the invention is shown in only one of its forms, it is not thus limited but is susceptible to various changes and modifications without departing from the spirit thereof.

What is claimed is:

1. An integrated manhole connection comprising:
    a manhole having a wall, the wall having an outside surface and an inside surface separated by a wall thickness;
    a wall opening communicating the outside and inside surface of the manhole for insertion of a mating pipe;
    the wall opening defining a peripheral surface relatively perpendicular to the outside surface of the manhole;
    a ring shaped elastomeric gasket body cast in place within a portion of the peripheral surface of the wall opening and having a substantially homogeneous composition which, when viewed in cross section, includes:
    a foot region enclosed within the wall thickness and connected to a leg region, the leg region terminating in a primary lip sealing surface of the gasket; and
    a rigid reinforcing ring which circumscribes and is encapsulated within the ring shaped elastomeric body and which passes through the elastomeric gasket body at a circumferential location which, when viewed in cross section, appears below the peripheral surface of the wall opening once the gasket is cast in place, the rigid reinforcing ring being located within the foot region of the gasket when the gasket is cast in place within the wall of the manhole, whereby the rigid reinforcing ring serves to more securely anchor the gasket within the cast manhole wall and thereby make the gasket more resistant to deformation during installation of the mating pipe within the wall opening.

2. The integrated manhole connection of claim 1, wherein the ring shaped elastomeric gasket body is formed of a natural or synthetic rubber.

3. The integrated manhole connection of claim 2, wherein the rigid reinforcing ring is formed of metal.

4. The integrated manhole connection of claim 1, wherein the manhole is formed of cast concrete.

5. The integrated manhole connection of claim 1, wherein the ring shaped elastomeric gasket body further comprises:

a leading nose region and a radially inwardly slanting primary sealing surface which forms a lip seal for engaging the mating pipe during insertion;

the primary sealing surface being joined to a secondary sealing surface by an intermediate circumferential groove region;

the secondary sealing surface comprising a planar circumferential region which terminates in an inside corner of the elastomeric body;

the inside corner being connected to the leg region of the elastomeric body by a sloping exterior wall region;

the leg region of the elastomeric body being connected to the foot region; and the foot region being connected to the nose region by a oppositely sloping wall region.

6. The integrated manhole connection of claim 1, wherein the foot region has at least one external rib formed thereon.

7. The integrated manhole connection of claim 6, wherein the foot region includes a plurality of external ribs arranged in mirror-image fashion when viewed in cross section.

8. The integrated manhole connection of claim 6, wherein the foot region, when viewed in cross section, terminates in a roof profile including an outwardly extending apex.

9. A method of forming an integrated manhole connection for a concrete manhole, the method comprising the steps of:

positioning a ring shaped elastomeric gasket body on a suitable concrete form, the gasket having a substantially homogeneous composition which, when viewed in cross section, includes:

a foot region enclosed within the wall thickness and connected to a leg region, the leg region terminating in a primary lip sealing surface of the gasket; and a rigid reinforcing ring which circumscribes and is encapsulated within the ring shaped elastomeric body and which passes passing through the elastomeric gasket body at a circumferential location;

casting concrete within the form and about the gasket body on the form so that the rigid reinforcing ring of the gasket, when viewed in cross section, appears below a peripheral surface of a wall opening in the concrete manhole once the gasket is cast in place, the rigid reinforcing ring being located within the foot region of the gasket when the gasket is cast in place within the wall of the manhole, whereby the rigid reinforcing ring serves to more securely anchor the gasket within the cast manhole wall and thereby make the gasket more resistant to deformation during installation of the mating pipe within the wall opening.

10. The method of claim 9, wherein the ring shaped elastomeric gasket body further comprises:

a leading nose region and a radially inwardly slanting primary sealing surface which forms a lip seal for engaging a mating pipe during insertion;

the primary sealing surface being joined to a secondary sealing surface by an intermediate circumferential groove region;

the secondary sealing surface comprising a planar circumferential region which terminates in an inside corner of the elastomeric body;

the inside corner being connected to the leg region of the elastomeric body by a sloping exterior wall region;

the leg region of the elastomeric body being connected to the foot region; and the foot region being connected to the nose region by a oppositely sloping wall region.

11. The method of claim 10, wherein the foot region has at least one external rib formed thereon.

12. The method claim 11, wherein the foot region includes a plurality of external ribs arranged in mirror-image fashion when viewed in cross section.

13. The method of claim 12, wherein the foot region, when viewed in cross section, terminates in a roof profile including an outwardly extending apex.

* * * * *